March 20, 1956     H. I. CLARK, JR     2,738,542
SHOCK ABSORBING CASTER
Filed April 21, 1952     2 Sheets-Sheet 1
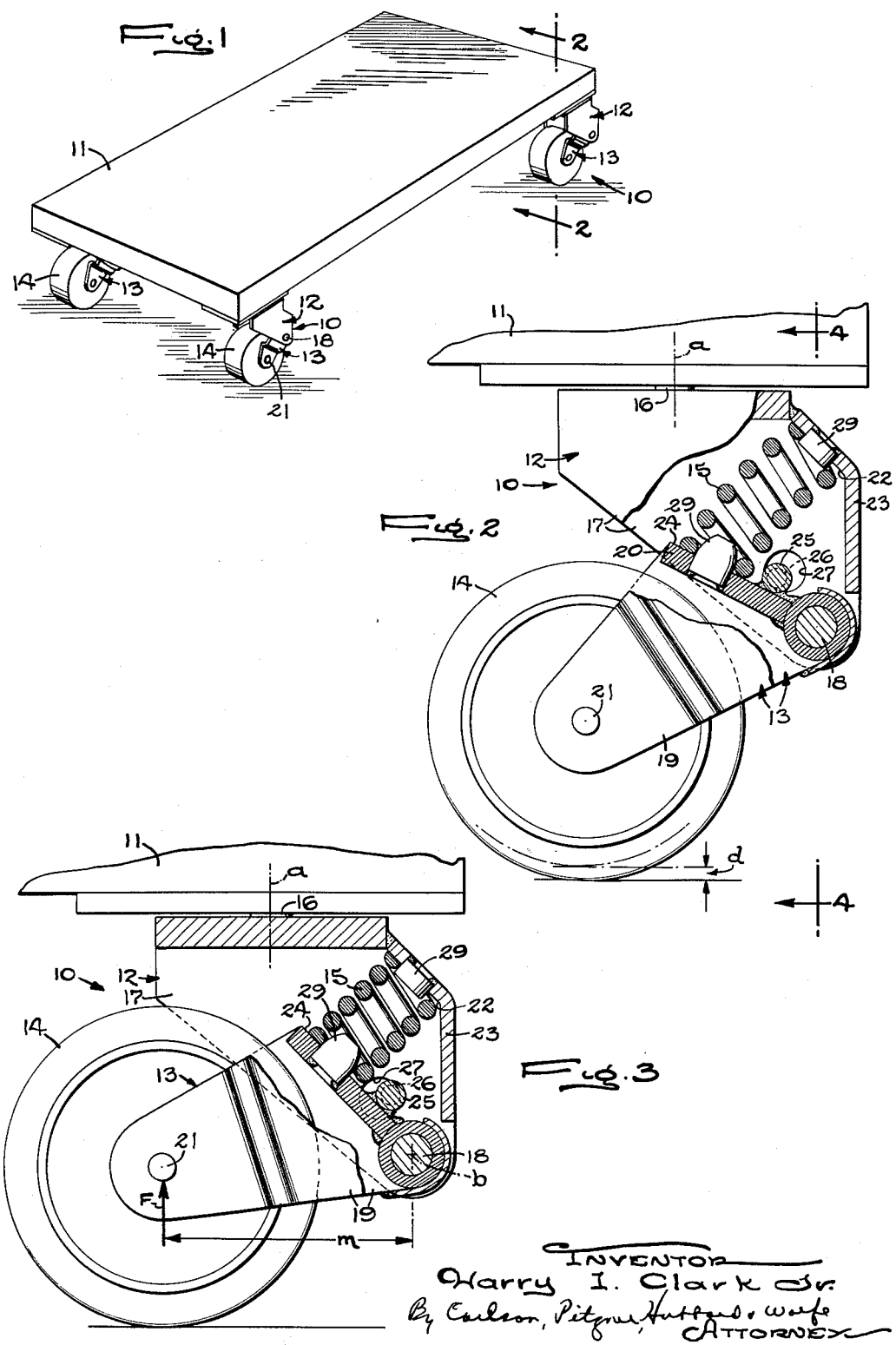

March 20, 1956 H. I. CLARK, JR 2,738,542
SHOCK ABSORBING CASTER
Filed April 21, 1952 2 Sheets-Sheet 2
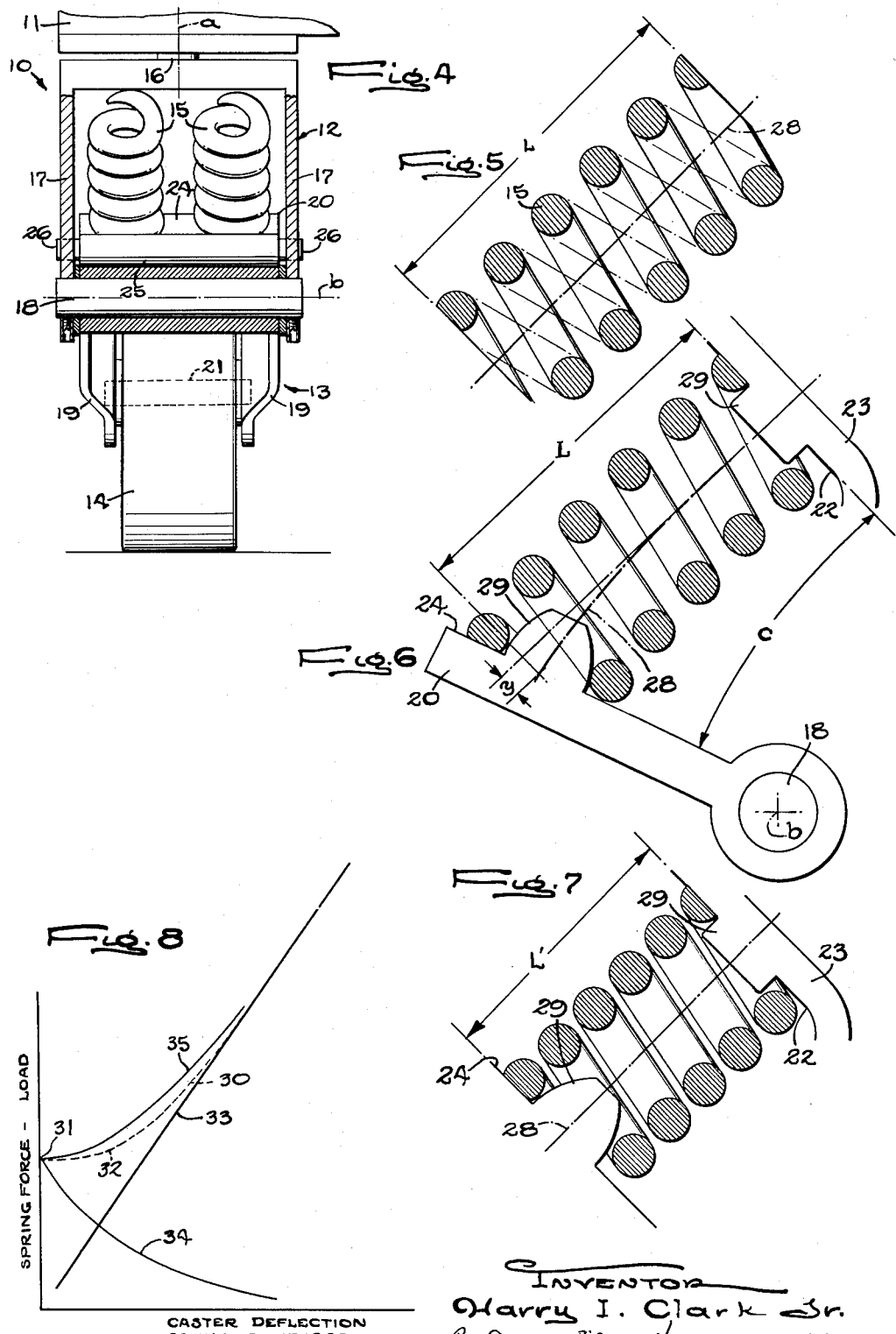
INVENTOR
Harry I. Clark Jr.
By Carlson, Pitzner, Hubbard & Wolfe
ATTORNEY

United States Patent Office 2,738,542
Patented Mar. 20, 1956

2,738,542

SHOCK ABSORBING CASTER

Harry I. Clark, Jr., Rockford, Ill., assignor to Harry I. Clark, Rockford, Ill.

Application April 21, 1952, Serial No. 283,449

1 Claim. (Cl. 16—44)

This invention relates to casters of the type in which the wheel of the caster is free to move vertically relative to the truck or other article being supported and in which such movement is resisted by compressing a cushion member so that the latter supports the load being carried and absorbs shock applied to the wheel or the truck. More particularly, the invention relates to a caster in which the cushion member is compressed between an abutment secured to the truck and an abutment movable vertically with the wheel which abutments are movable angularly with respect to each other.

The general object of the invention is to provide a new and improved caster of the above character in which the cushion member is capable of supporting comparatively heavy loads and is also capable of absorbing shock effectively when the truck is carrying light loads which are only a small fraction of the total load capacity of the truck.

Another object is to provide such a caster by making the cushion member in the form of a helically coiled compression spring and utilizing the changing angular relation of the two abutments to bend and straighten the spring progressively as the wheel moves down and up whereby the spring has the characteristics of a weak spring under initial loads and of a strong spring under heavier loads.

Other objects and advantages of the invention will become apparent from the following detailed description taken in connection with the accompanying drawings, in which Figure 1 is a perspective view of a truck employing casters constructed in accordance with the present invention.

Fig. 2 is a sectional view taken along the line 2—2 in Fig. 1.

Fig. 3 is a view similar to Fig. 2 showing the wheel in another position.

Fig. 4 is a sectional view taken along the line 4—4 in Fig. 2.

Figs. 5, 6 and 7 are schematic views showing the action of the caster spring.

Fig. 8 is a graph illustrating the action of the caster.

As shown in the drawings, the invention is embodied in a shock absorbing caster 10 which is adapted to be secured to the underside of the platform 11 of a truck and comprises a stationary part 12 depending from the platform and a vertically movable part 13 carrying a wheel 14 with a cushion member 15 acting between the two parts and urging the movable part and the wheel downwardly. In the present instance, the stationary part 12 is in the form of an inverted U-shaped bracket which is joined to the truck platform by an upright swivel pin 16 to turn about a vertical axis $a$ so that the caster wheel may roll in the direction of truck movement. Spanning the downwardly projecting legs 17 of the bracket adjacent the lower ends thereof is a stationary horizontal shaft 18 on which one end of an arm constituting the movable part 13 is pivoted to swing about a horizontal axis $b$ (Fig. 4). As shown, the arm is also U-shaped with its legs 19 extending downwardly and outwardly from the pivotal axis $b$ and its crosspiece 20 projecting upwardly and outwardly from the axis. The wheel 14 is received between the legs 19 and is journaled at the outer free end of the arm on an axle 21. With this construction relative vertical movement between the wheel and the platform 11 results in the arm 13 swinging about the axis $b$.

To support the weight of the platform 11 and the articles being carried and to absorb any shock applied to either the platform or the wheel 14, the cushion member 15 acts between the bracket 12 and the arm 13 and exerts a force on the latter tending to swing the arm counterclockwise as viewed in Figs. 2 and 3 and urge the wheel downwardly. For this purpose, the cushion member is disposed between the inner surface 22 of a web 23 spanning the back edges of the bracket legs 17 and the upper surface 24 of the arm crosspiece 20 with opposite ends of the cushion member abutting against the two surfaces. Herein the abutment surface 22 on the web is inclined with respect to the vertical and generally opposes the abutment surface 24. If desired, two or more cushion members 15 disposed side by side may be used as shown in Fig. 4, the number depending upon the desired weight capacity of the truck.

Means is provided to limit the angle through which the arm 13 may swing and hence the relative movement between the abutment surfaces 22 and 24. Herein this means comprises a bar 25 fast on the upper side of the crosspiece 20 and paralleling the pivotal axis $b$ with its ends 26 reduced and projecting into alined holes 27 formed in the legs 17 of the bracket 12. The holes are larger in diameter than the bar ends permitting relative movement between the arm and the bracket before the ends abut against the edges of the holes to stop the arm in its lower or upper limit position as illustrated in Figs. 2 and 3 respectively. For a purpose to appear later, the position of the holes 27 is such that the abutment surfaces 22 and 24 are parallel when the arm is in its upper limit position and, as the arm swings down toward its lower limit position, they define between them an acute included angle $c$ (Fig. 6) which increases progressively.

With the above arrangement, the platform 11 descends turning the arm 13 clockwise against the action of the cushion member 15 when a load is placed on the platform until the added weight is just balanced by the increased force of the cushion member due to compression. Similarly, the arm swings up compressing the cushion member when a shock load is applied as by the wheel 14 encountering a bump and thus the caster serves also to absorb shock and protect the articles being carried on the platform from damage. In each case, the wheel moves vertically relative to the platform and such movement, which is the same whether caused by added weight or by shock, may be termed caster deflection, that is the distance $d$ (Fig. 2). All the forces producing this deflection, namely the reaction forces due to the weight of the truck and the weight of the articles being carried and the force of shock, act together and may be combined and represented as a single upwardly acting force F (Fig. 3) applied to the axle 21 of the wheel.

In accordance with the present invention, advantage is taken of the changing angle between the abutment surfaces 22 and 24 to produce a caster in which the restoring force of the cushion member 15 increases at a faster rate when the arm 13 is in the upper portion of its range of movement than it does during initial caster deflection by making the cushion member in the form of a helically coiled spring which is bent longitudinally when the arm is in its lower limit position and progressively unbends as the arm swings up so that a single spring may be used to produce the functions of a weak spring when there is little or no load on the platform 11 and of a strong spring when heavier loads are applied. Accordingly, the spring 15 is disposed between the crosspiece 20 and the web 23 with its ends seated against the abutment surfaces 22 and 24 and the spring axis 28 (Fig. 6) bent along an arc of the angle $c$ defined by the surfaces. The ends of the spring are held against lateral shifting relative to the abutment surfaces and, for this purpose, pins 29 pressed into the crosspiece 20 and the web 23 project outwardly from the surfaces and into the spring ends, the latter preferably being squared to lie flat against the surfaces. Thus, when the arm 13 is in its lower limit position, the bending of the spring 15 is maximum and, as the arm swings up, the spring progressively unbends until it is straight when the arm reaches the upper limit position and the surfaces 22 and 24 are parallel.

With the above arrangement of the spring 15, the caster functions in a manner that may best be understood by reference to the graph in Fig. 8 in which the ordinate is measured in units of load denoting the force F, the abscissa is in units of caster deflection $d$ and the line 30 represents the caster deflection under various conditions of load. At the point 31 on this line, the load is equal to the empty weight of the truck and the caster deflection is zero and, from this point, the line slopes very gradually for initial loads and then at a subsequent point 32 swings sharply upwardly. Between the points 31 and 32, the addition of a small load causes a large caster deflection while beyond the point 32 an appreciably larger increase in load is required to produce the same amount of deflection. Thus the action of the caster is as if the spring 15 were weak when the load is light and strong under heavy loads.

Such caster action is the result of bending the spring 15 so that the latter exerts a restoring force which depends upon the bending as well as the compression of the spring. In other words, the force exerted by the spring is made up of two components, one caused by compression and the other by bending.

The force component due to compression increases progressively as the spring 15 is compressed and is measured by the change in length of the spring along its axis 28. As the arm 13 swings up, the spring is compressed in equal increments between the abutment surfaces 22 and 24. In the present instance, the spring has a constant rate, that is the force exerted by the spring is directly proportional to the change in the length, and the force component due to compression may be expressed by the following equation:

(1) $\qquad P' = kx$ where:

$P'$ is the compression force component,
$k$ is the spring constant or rate and
$x$ is the change in the length of the spring axis.

Preferably, the curved length of the spring axis 28 when the arm 13 is in its lowest position is equal to the free length L (Fig. 5) of the spring and thus the spring compression increases from zero to a maximum as the arm swings up. In this case, therefore, the compression component $P'$ when plotted against the amount of compression $x$ is represented in the graph of Fig. 8 by a straight line 33 extending upwardly from the origin.

The second force component produced by bending the spring 15 is measured by the length L of the spring axis and the distance $y$ (Fig. 6) that the axis has been displaced from the straight line defined by the axis when the spring is free and not bent as shown in Fig. 5. The displacement of the axis is at a maximum when the arm 13 is in its lower limit position and decreases at a constant rate as the arm moves up until the upper limit of movement is reached when the spring is straight as seen in Fig. 7 and the displacement is zero. Similarly, the length of the axis decreases at a constant rate during upward swinging of the arm from a maximum equal to the free length L to a minimum length L' (Fig. 7). In an elastic body, the force due to bending within the elastic limits may be expressed by the proportionality (2) $\qquad P^2 \sim \dfrac{y}{(L)^3}$ where $P^2$ is the bending force. When this relation is applied to the spring 15, the force of bending begins at the point 31 on the graph and follows downwardly along the line 34 which is curved since it depends upon the cube of the spring length. Herein the initial force due to bending represented by the point 31 exactly balances the empty weight of the truck.

When added together, the compression force and the bending force produce a resultant spring force represented by the line 35 which at the beginning is generally horizontal and then swings upwardly. If the force of the spring 15 and the force F acted on the arm 13 at constant distances from the pivotal axis $b$, the caster deflection $d$ would increase at the same rate as the total spring force and follow the line 35. The lever arm $m$ (Fig. 3) of the force F, however, increases in length as the arm swings up and by virtue of the changing length of this lever arm, the actual caster deflection curve 32 is flatter initially than the spring curve 35 and thus the caster 10 is even more sensitive to shock under light load conditions.

As will be seen from the graph, the initial bending force of the spring 15 just balances the weight of the truck 11 and thus the first load added to the truck lifts the stops 26 away from the edges of the holes 27. With this construction, the full range of spring compression is available for resisting additional loads such as may be applied by shock or added weight. By virtue of the fact that the bending force decreases as the compression force increases, the effective force of the spring increases very gradually as the arm 13 is swung upwardly from its lower limit position so that light loads which are only a small fraction of the total weight capacity of the truck produce an appreciable caster deflection and the spring is, therefore, effective to absorb shock when the truck is carrying a light weight article. At the same time, the load-carrying capacity of the spring is not diminished since, at the upper end of the arm travel, the force of the spring is the same as if compression had occurred along a straight line as evidenced by the merging of the lines 32 and 33. Thus the caster is effective to protect light weight articles from shock and also is capable of carrying heavy loads.

I claim as my invention:

In a load supporting device, the combination of, a load supporting member of predetermined weight, a bracket projecting downwardly from said member and having a downwardly facing abutment adjacent the upper end thereof, an arm projecting at one end on the lower end of said bracket to swing through a predetermined range about a horizontal axis and having an abutment generally opposing and spaced from the abutment on said bracket, said abutments defining between them an acute angle which decreases progressively as said arm swings up about said axis, means limiting the downward movement of said arm, a helical compression spring having a uniform diameter throughout its length and being of a predetermined free length when no load is applied to the spring, said spring being disposed between said abutments with its ends seated against the same and being bent longitudinally around said axis when said arm is in its lower limit position, means for holding the ends of said spring against shifting relative to said abutments whereby the spring is straightened progressively as the arm swings up, the curved axial length of said spring being substantially equal to said predetermined free length when there is no load supported by said member whereby the force caused by bending the spring substantially balances the weight of the member, and a supporting wheel journaled on the outer free end of said arm.

References Cited in the file of this patent

UNITED STATES PATENTS

| | | |
|---|---|---|
| 904,270 | Lippy | Nov. 17, 1908 |
| 1,129,796 | Donahoo | Feb. 23, 1915 |
| 2,271,304 | Mulholland | Jan. 27, 1942 |
| 2,338,478 | Wulff | Jan. 4, 1944 |
| 2,564,996 | Rasbach | Aug. 21, 1951 |

FOREIGN PATENTS

| | | |
|---|---|---|
| 523,115 | Great Britain | July 5, 1940 |